United States Patent [19]
Morley

[11] Patent Number: 5,926,746
[45] Date of Patent: Jul. 20, 1999

[54] FREQUENCY AND OTHER PARAMETER ADJUSTMENT USING TRAINING CHANNEL

[75] Inventor: Steven A. Morley, Escondido, Calif.

[73] Assignee: QUALCOMM Incorporated, San Diego, Calif.

[21] Appl. No.: 08/744,904

[22] Filed: Nov. 8, 1996

[51] Int. Cl.$^6$ .................................................. H04B 7/00
[52] U.S. Cl. ...................... 455/13.2; 455/12.1; 455/71; 455/67.1
[58] Field of Search ................... 455/12.1, 13.2, 455/69, 71, 67.1, 67.3, 67.4, 517, 561

[56] References Cited

U.S. PATENT DOCUMENTS

| | | | |
|---|---|---|---|
| 4,509,200 | 4/1985 | Luginbuhl et al. | 455/13.2 |
| 4,901,368 | 2/1990 | Arnold et al. | 455/71 |
| 5,471,657 | 11/1995 | Gharpuray | 455/71 |
| 5,613,193 | 3/1997 | Ishikawa et al. | 455/67.1 |
| 5,701,589 | 12/1997 | Lee et al. | 455/71 |

*Primary Examiner*—Andrew M. Dollnar
*Assistant Examiner*—Hieu T. Vo
*Attorney, Agent, or Firm*—Russell B. Miller; Gregory D. Ogrod; Brian S. Edmonston

[57] ABSTRACT

A novel and improved method and system for reducing the bandwidth requirements of satellite or wireless communication networks is described. In accordance with one embodiment of the invention, a training sequence is transmitted over a training channel from a terminal to a master station. The master station measures a frequency error of the training sequence, and provides the frequency error to the terminal. The terminal adjusts its transmit frequency by the frequency error, offsetting all further data channel transmissions by the frequency error.

12 Claims, 3 Drawing Sheets

COMMUNICATION SATELLITE NETWORK

PRIOR ART

FREQUENCY AND OTHER PARAMETER ADJUSTMENT USING TRAINING CHANNEL

BACKGROUND OF THE INVENTION

I. Field of the Invention

The present invention relates to wireless communications. More particularly, the present invention relates to a novel and improved method and system for reducing the bandwidth requirements of satellite or wireless communication networks involving multiple channels.

II. Description of the Related Art

Wireless networks in which multiple communication terminals communicate via radio frequency (RF) signals are well known. In some instances, the RF signals are relayed from an orbiting satellite. In other instances, the RF signals are transmitted to terrestrial based systems. An example of a satellite based system is shown in FIG. 1, but the process and operation of the present invention applies to other communication networks.

Communication using the satellite network of FIG. 1 involves transmission of digital information and control information via RF signals 6 relayed by satellite 8 to and from terminals 10 and master station 12. The invention provides a bandwidth saving method which specifically applies to the transmissions in the direction from the terminals to the master station, referred to the "return link," indicated in FIG. 1.

System like that shown in FIG. 1 generally use multiple frequency-division channels for transmissions to and from the terminals over an allocated RF bandwidth. FIG. 2 shows a set of frequency divided channels, each requiring a minimum amount of RF bandwidth indicated as "$F_c$" Hertz. The value of $F_c$ is dependent on several factors, including the transmitted symbol or data rate, modulation type, and necessary bandwidth rolloff margin. The resulting necessary bandwidth per channel is referred to as the "occupied bandwidth".

In an ideal system, the occupied bandwidth and the channel separation values could be the same. However, this would require that the frequency source in the terminal (herein referred to as the "frequency synthesizer") provide a transmission frequency reference of the precise value required for the intended channel frequency as measured at the receiving station.

In actual systems, the terminal frequency synthesizer will have frequency errors which vary from terminal to terminal and over time. These frequency errors may be significant compared to the required occupied bandwidth. Additionally, other aspects of the communication path may cause additional frequency errors from the ideal intended frequency of operation. Therefore, the channel separation frequency must be increased to allow for the necessary occupied bandwidth and the transmit frequency uncertainty.

FIG. 3 illustrates the minimum channel spacing given a frequency error range $F_e$, including the errors by the terminal operation added to the errors of the communication path effects. As shown, in order to ensure that two adjacent channels do not interfere with one another, the channel separation required is $F_c+(2 \cdot F_e)$. The extra bandwidth required by this potential frequency error can add significant cost to the network operation because it reduces the number of channels that can be supported in the given bandwidth. Given the limited nature of RF bandwidth, increased bandwidth requirements increase the cost of communication. Thus, a method and apparatus for reducing the necessary bandwidth requirements would be highly desirable.

SUMMARY OF THE INVENTION

The present invention is a novel and improved method and system for reducing the bandwidth requirements of satellite or wireless communication networks. In accordance with one embodiment of the invention, a training sequence is transmitted over a training channel from a terminal to a master station. The master station measures a frequency error of the training sequence, and provides the frequency error to the terminal. The terminal adjusts its transmit frequency by the frequency error, offsetting all further data channel transmissions by the frequency error.

BRIEF DESCRIPTION OF THE DRAWINGS

The features, objects, and advantages of the present invention will become more apparent from the detailed description set forth below when taken in conjunction with the drawings in which like reference characters identify correspondingly throughout and wherein.

DETAILED DESCRIPTION OF THE PREFERRED EMBODIMENTS

A novel and improved method for reducing the bandwidth requirements of satellite or wireless communication networks involving multiple channels is described.

Figure 4:
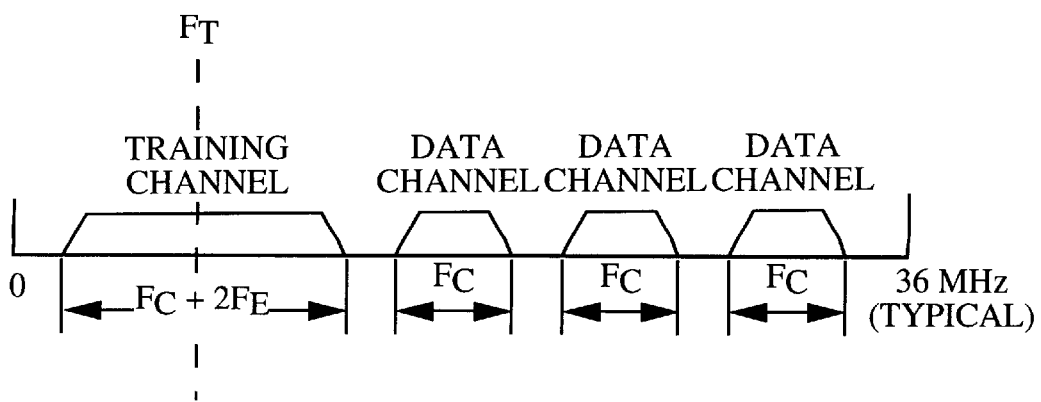
FIG. 4 is an illustration of an exemplary set of data channels and a training channel.

In accordance with one embodiment of the invention, a training channel is established in addition to a set of data channels. FIG. 4 illustrates an exemplary set of data channels and a training channel. As shown, the bandwidth of the training channel is the total required channel spacing minimum is $F_c+2 \cdot F_e$, where $F_c$ is the bandwidth necessary for the data channel, and $F_e$ is the minimum frequency error range including the errors by the terminal operation as well as errors created by communication path effects.

Figure 1:
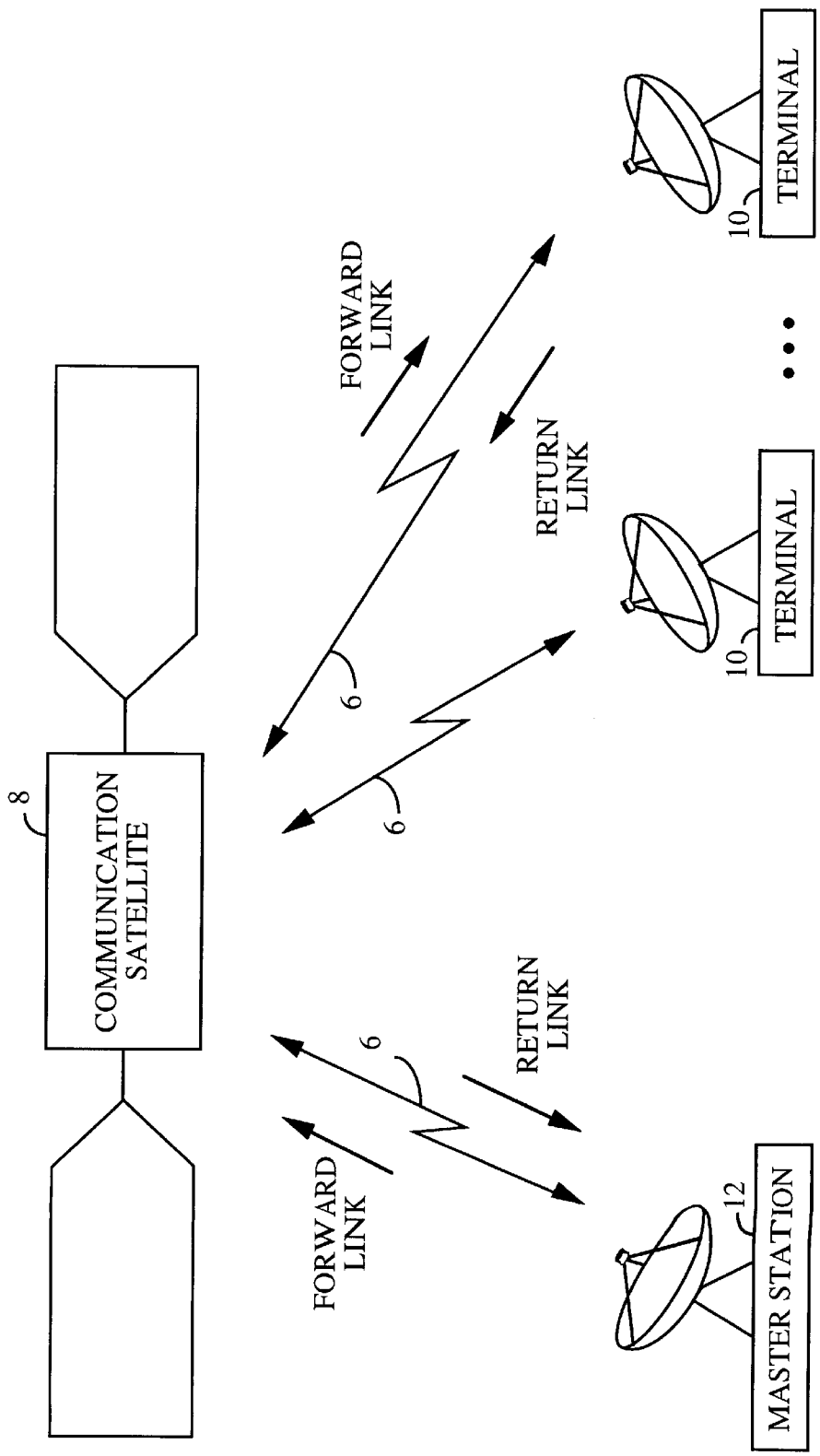
FIG. 1 is a block diagram of a satellite based wireless communication system.
Figure 2:
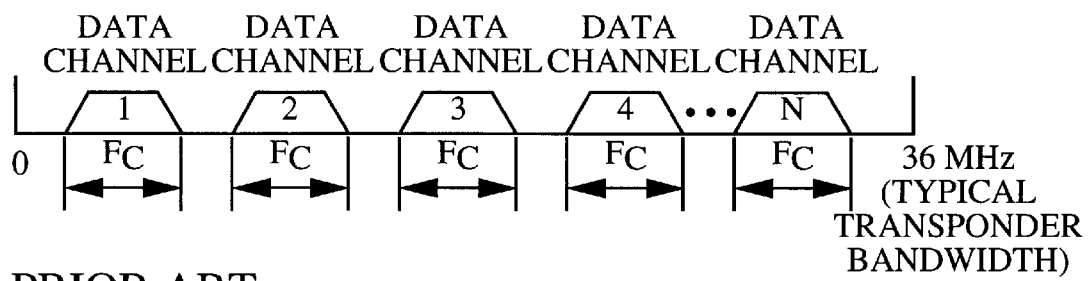
FIG. 2 is an illustration of a set of frequency divided channels.
Figure 3:
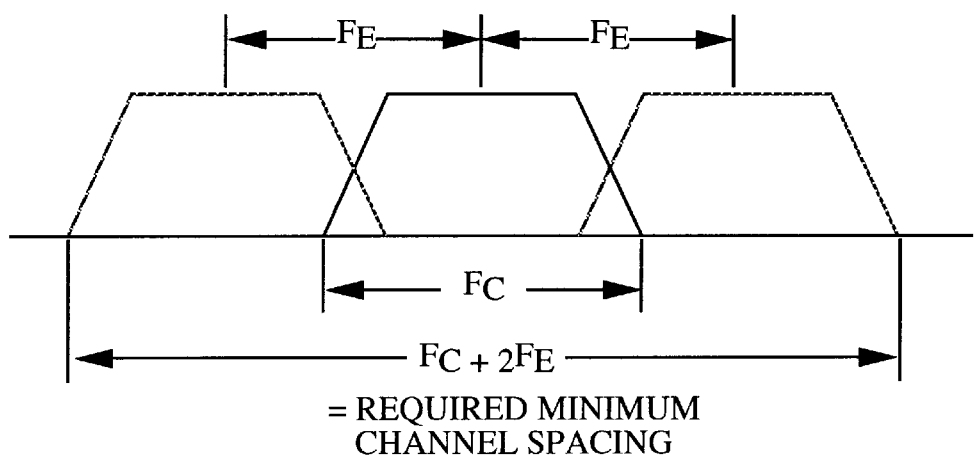
FIG. 3 is an illustration the minimum channel spacing given a frequency error range $F_e$.
Figure 5:
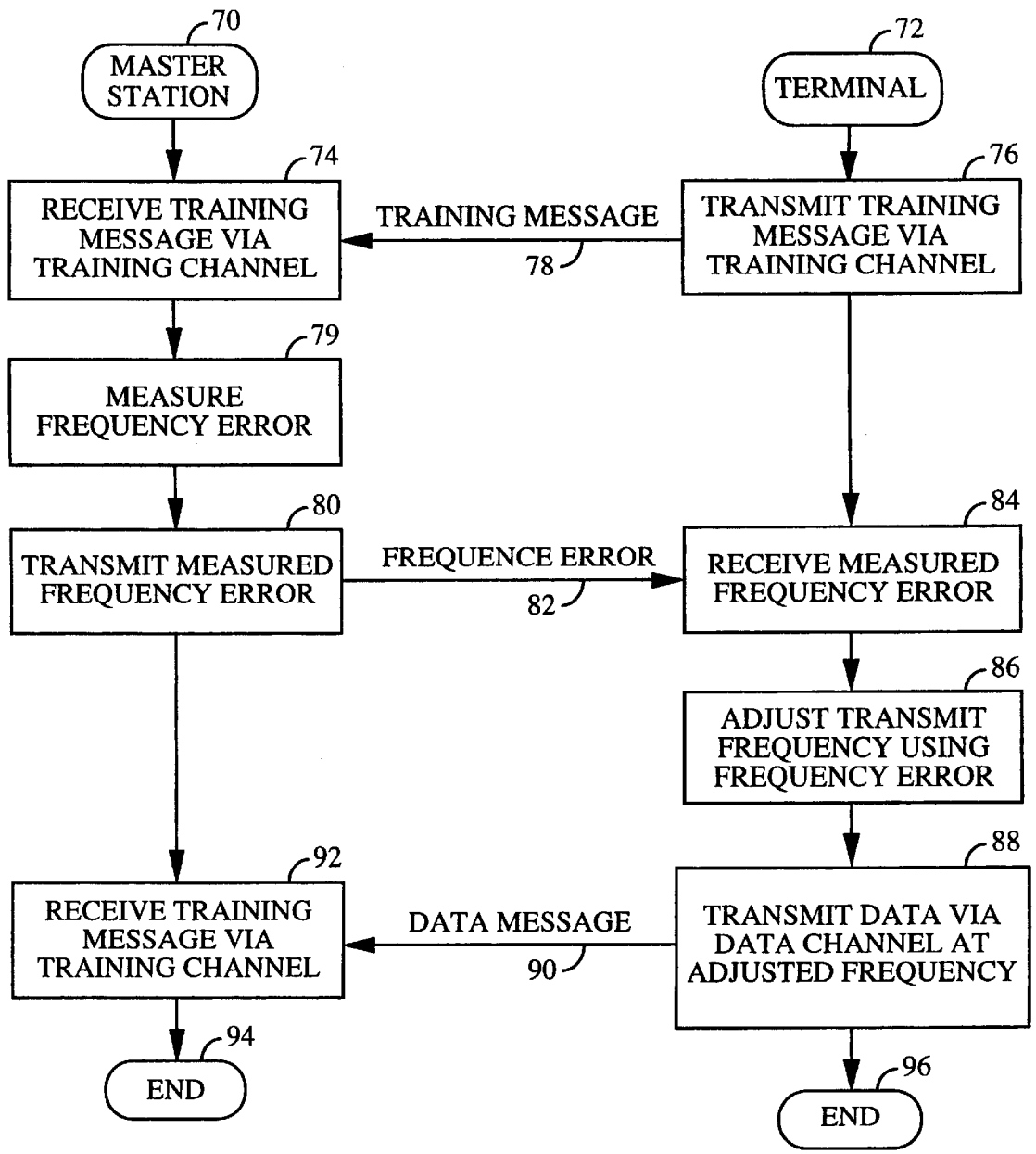
FIG. 5 is flow chart illustrating the operation of a terminal and master station in accordance with one embodiment of the invention.

FIG. 5 is a flow chart illustrating the steps performed by terminal 10 and master station 12 (FIG. 1) when configured in accordance with one embodiment of the invention. The steps performed by master station 12 are shown at the left, and the steps performed by terminal 10 are shown at the right. Messages are shown as horizontal lines.

Communication begins at step 70 for master station 12, and at step 72 for terminal 10. At step 76, terminal 10 transmits training message 78 over the training channel. Terminal 10 attempts to transmit training message 78 on the precise center frequency $F_t$ of the training channel, and training messages 78 is preferably comprised of a training data sequence.

Due to frequency errors in the frequency synthesizer of terminal 10, however, as well as any other frequency errors caused by other aspects of the communication path including those in the satellite, master station 12 will receive the message with a frequency error at step 74. Master station 12 measures the received frequency error at step 79, and this measured frequency error is reported to the terminal 10 at step 80 using frequency error message 82. Frequency error message 82 is transmitted on the communication path from the master station 12 to the terminal via the forward link shown in FIG. 1.

At step 84 terminal 10 receives frequency error message 82, and at step 86 responds to the frequency error received from the master station 12 by adjusting its transmission frequency for future transmissions. That is, the terminal 10 adds or subtracts an offset to the frequency synthesizer that is equal to the frequency error received.

One skilled in the art will recognized that the preferred embodiment of the invention calls for a frequency agile terminal 10. That is, terminal 10 must be able to tune its transmit frequency, preferably in small frequency steps.

Once the frequency synthesizer of terminal 10 is adjusted, terminal 10 switches its transmission frequency to a data channel for normal data transmissions, but still including the offset for the frequency error. At step 88 terminal 10 transmits a data message 90 to master station 12 at the adjusted data channel frequency. Master station 12 receives the data message 90 at step 92. The process of establishing communication is terminated at the master station at step 94, and at terminal 10 at step 96.

Because terminal 10's frequency error correction factor is now "pre-computed", the required bandwidth for this data channel is only $F_c$, as shown in FIG. 4, rather than $(F_c+2 \cdot F_e)$. Reducing the required bandwidth of a traffic channel increases the number of communications that can be conducted using a given amount of RF bandwidth. For example, in networks with "N" multiple data channels, the total network bandwidth is reduced from $(N \cdot (F_c+2 \cdot F_e))$ to $((N+1) \cdot F_c+(2 \cdot F_e))$. This can be a significant bandwidth savings to the network.

In alternative embodiments of the invention, a data channel frequency $F_{dc}$ error is also included in the data channel frequency allocation scheme. However, the data channel frequency error will be substantially less than the total error $F_e$.

Note that the training channel may use a different modulation scheme, or transmission data rate, or both, during the frequency training process. In this case, the $F_c$ of the training channel may be less than the $F_c$ of the data channels, providing further bandwidth savings. It is even possible that the training channel signal be an unmodulated carrier reducing $F_c$ to an absolute minimum.

In one embodiment of the invention, the training channel process is repeated as often as necessary to re-establish or maintain the terminal frequency correction.

Those skilled in the art will recognize various extensions to the present invention that utilize a similar "training channel" scheme for measurement and offset of errors in other communication link parameters. These other training channel parameters include timing or power levels. Just as the above invention description defines a method used for frequency error correction, a very similar approach would use a training channel to measure an error, report a correction factor, and offset the terminal transmission parameter (including power or timing) for future data transmissions.

The previous description of the preferred embodiments is provided to enable any person skilled in the art to make or use the present invention. The various modifications to these embodiments will be readily apparent to those skilled in the art, and the generic principles defined herein may be applied to other embodiments without the use of the inventive faculty. Thus, the present invention is not intended to be limited to the embodiments shown herein but is to be accorded the widest scope consistent with the principles and novel features disclosed herein.

I claim:

1. A system for reducing the bandwidth requirement for the transmission of signals from a terminal to a master station, comprising:

a master station for transmitting a measured frequency error of a training message received via a training channel; and a terminal for transmitting said training message via said training channel, and for receiving said measured frequency error and adjusting the transmission frequency for the transmission of data messages via a data channel from said terminal based on said measured frequency error, said data channel having a reduced bandwidth requirement.

2. The system of claim 1 wherein the bandwidth of said training channel is greater than the bandwidth of said data channel.

3. The system of claim 2 wherein said training channel bandwidth is equal to said data channel bandwidth plus twice a frequency error range.

4. The system of claim 1 wherein the bandwidth of said training channel is less than the bandwidth of said data channel.

5. The system of claim 1 wherein the modulation scheme of said training channel is different from the modulation scheme of said data channel.

6. The system of claim 1 wherein the transmission data rate of said training channel is different from the transmission data rate of said data channel.

7. A method for reducing the bandwidth required for the transmission of signals from a terminal to a master station in a wireless communication network, comprising the steps of:

transmitting a training message from said terminal to said master station via a training channel;

measuring a frequency error of said training message at said master station;

transmitting said measured frequency error from said master station to said terminal; and adjusting a transmission frequency for the transmission of data messages via a data channel from said terminal based on said measured frequency error, said data channel having a reduced bandwidth requirement.

8. The method of claim 7 wherein the bandwidth of said training channel is greater than the bandwidth of said data channel.

9. The method of claim 8 wherein said training channel bandwidth is equal to said data channel bandwidth plus twice a frequency error range.

10. The method of claim 7 wherein the bandwidth of said training channel is less than the bandwidth of said data channel.

11. The method of claim 7 wherein the modulation scheme of said training channel is different from the modulation scheme of said data channel.

12. The method of claim 7 wherein the transmission data rate of said training channel is different from the transmission data rate of said data channel.

* * * * *